(12) United States Patent
Kaza et al.

(10) Patent No.: US 8,725,949 B2
(45) Date of Patent: *May 13, 2014

(54) ASYNCHRONOUS DATA BINDING

(71) Applicant: Microsoft Corporation, Redmond, WA (US)

(72) Inventors: Akhilesh Kaza, Sammamish, WA (US); Shawn Patrick Burke, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/925,649

(22) Filed: Jun. 24, 2013

(65) Prior Publication Data

US 2013/0290251 A1    Oct. 31, 2013

Related U.S. Application Data

(63) Continuation of application No. 13/301,232, filed on Nov. 21, 2011, now Pat. No. 8,499,122.

(51) Int. Cl.
*G06F 12/08* (2006.01)

(52) U.S. Cl.
USPC .......... 711/126; 711/118; 711/E12.001; 711/E12.002

(58) Field of Classification Search
USPC .......... 711/126, 118, E12.001, E12.002
See application file for complete search history.

(56) References Cited

U.S. PATENT DOCUMENTS

| | | | |
|---|---|---|---|
| 6,023,271 A | 2/2000 | Quaeler-Bock et al. | |
| 6,330,006 B1 | 12/2001 | Goodisman | |
| 6,378,004 B1 | 4/2002 | Galloway et al. | |
| 6,460,058 B2 | 10/2002 | Koppolu et al. | |
| 7,506,341 B2 | 3/2009 | Bent et al. | |
| 2013/0132676 A1 | 5/2013 | Kaza et al. | |

FOREIGN PATENT DOCUMENTS

KR   0-20060059335   6/2006

OTHER PUBLICATIONS

Dahn, Udi, "Optimizing a Large Scale Software + Services Application", Published on: Apr. 2009, Available at: http://msdn.microsoft.com/en-us/magazine/dd569749.aspx.
Salman, Milena, "Practical Tips for Boosting the Performance of Windows Forms Apps", Published on: Mar. 2006, Available at: http://msdn.microsoft.com/en-us/magazine/cc163630.aspx.
"The WPF Dude", Published at least by Sep. 20, 2008. Available at: http://www.wpfdude.com/articles/BindingToElement.aspx.
"RadGridView for WPF", Published at least by Nov. 14, 2008. Available at: http://www.telerik.com/products/wpf/gridview.aspx.

(Continued)

*Primary Examiner* — Yong Choe
(74) *Attorney, Agent, or Firm* — Aaron Chatterjee; Peter Taylor; Micky Minhas

(57) ABSTRACT

The present invention extends to methods, systems, and computer program products for asynchronously binding data from a data source to a data target. A user interface thread and a separate thread are used to enable the user interface thread to continue execution rather than blocking to obtain updated data, to which elements of a user interface that the user interface thread is managing, are bound. The separate thread obtains updated data from a data source, stores the updated data in a local cache, and notifies the user interface thread of the updated data's presence in the local cache. The user interface thread, upon detecting the notification, accesses the updated data in the local cache and populates the updated data into the user interface.

20 Claims, 2 Drawing Sheets

(56) References Cited

OTHER PUBLICATIONS

Holmstrom, Adam, "Performance and Usability Improvements for Massive Data Grids using Silverlight", Published on: Feb. 14, 2011, Available at: http://www8.cs.umu.se/education/examina/Rapporter/AdamHolmstrom.pdf.

Office Action dated Mar. 4, 2013 cited in U.S. Appl. No. 13/301,232.

Notice of Allowance dated Apr. 10, 2013 cited in U.S. Appl. No. 13/301,232.

ASYNCHRONOUS DATA BINDING

CROSS-REFERENCE TO RELATED APPLICATIONS

This application is a continuation of U.S. patent application Ser. No. 13/301,232 filed on Nov. 21, 2011, entitled "ASYNCHRONOUS DATA BINDING," which issued as U.S. Pat. No. 8,499,122 on Jul. 30, 2013, and which application is expressly incorporated herein by reference in its entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Users interact with these computer systems through applications, and more specifically, through user interfaces of the applications. A user's perception of an application executed on a computer system is largely based on the usability of the application's user interface. Most users expect an application's user interface to be always responsive. If the application's user interface is not responsive, the user will often believe that the application is faulty. However, in many applications, the user interface relies on data that is not immediately available. For example, the data may be stored remotely, or may be stored locally, but require processing before it is ready to be displayed. Therefore, in such applications, if the user requests to view data that is not immediately available, the application's user interface oftentimes appears to be unresponsive while the data to be displayed is being obtained.

BRIEF SUMMARY

Embodiments of the present invention extend to methods, systems, and computer program products for asynchronously binding data from a binding source to a binding target. In one embodiment, a multi-threaded application displays a user interface via a user interface thread. The user interface thread determines that data to which an element of the user interface is bound is to be updated. The user interface thread accesses a local cache to determine whether updated data is stored in the local cache. The user interface thread requests a separate thread to retrieve updated data from a data source to which the element of the user interface is bound. In this manner, the user interface thread continues execution without blocking until updated data is obtained. The separate thread then requests the updated data from the data source. Upon receiving the updated data, the separate thread stores the updated data in the local cache. Then, the separate thread notifies the user interface thread that the updated data has been stored in the local cache.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
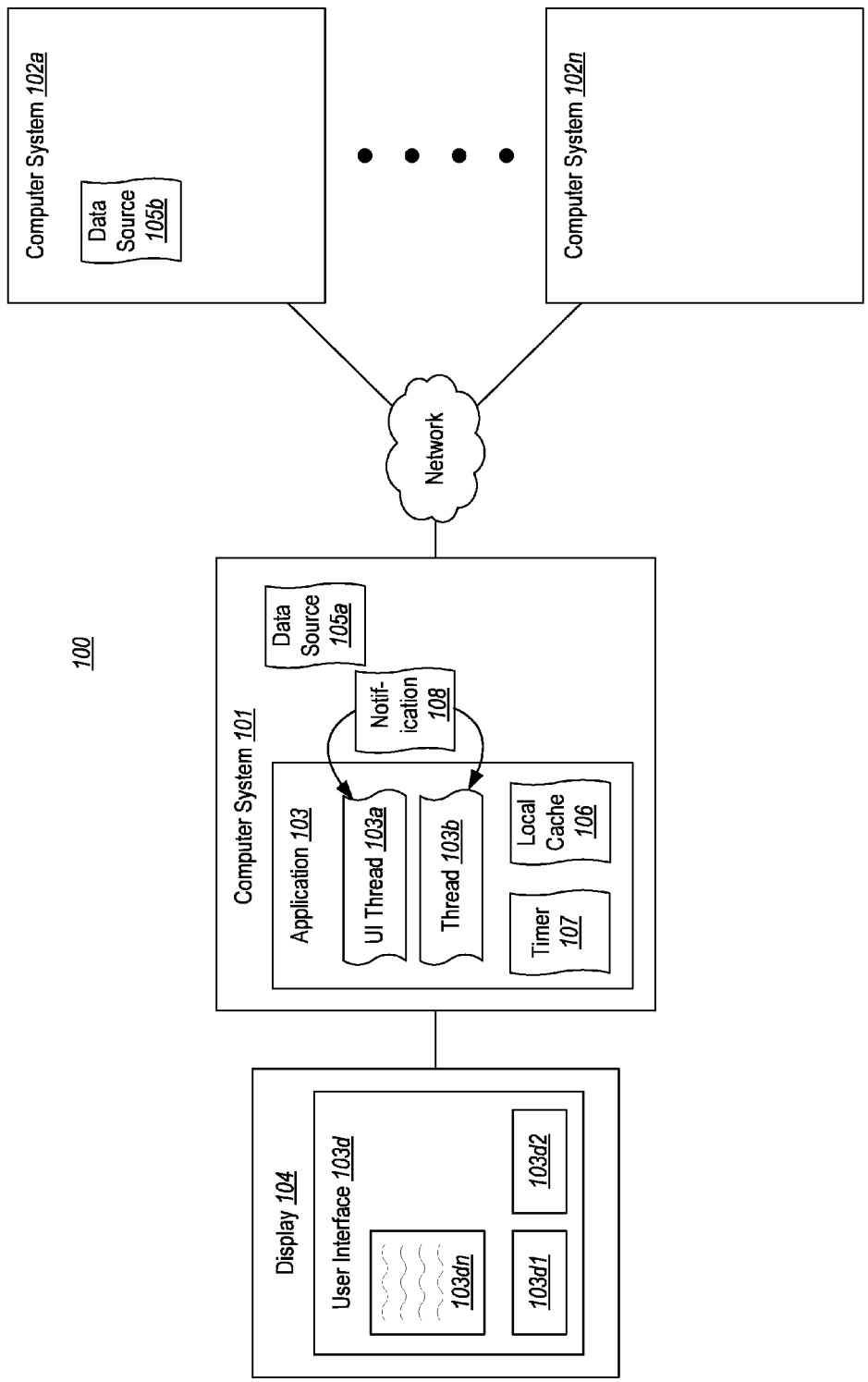
FIG. 1 illustrates an example computer architecture that facilitates asynchronously binding data from a binding source to a binding target.

Embodiments of the present invention extend to methods, systems, and computer program products for asynchronously binding data from a binding source to a binding target. In one embodiment, a multi-threaded application displays a user interface via a user interface thread. The user interface thread determines that data to which an element of the user interface is bound is to be updated. The user interface thread accesses a local cache to determine whether updated data is stored in the local cache. The user interface thread requests a separate thread to retrieve updated data from a data source to which the element of the user interface is bound. In this manner, the user interface thread continues execution without blocking until updated data is obtained. The separate thread then requests the updated data from the data source. Upon receiving the updated data, the separate thread stores the updated data in the local cache. Then, the separate thread notifies the user interface thread that the updated data has been stored in the local cache.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates asynchronously binding data from a binding source to a binding target. Referring to FIG. 1, computer architecture 100 includes computer system 101 and potentially one or more other computer systems such as computer systems 102a-102n. Each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Turning now to FIG. 1, Computer system 101 executes multi-threaded application 103 that includes user interface thread 103a and one or more other threads such as thread 103b. User interface thread 103a manages the display of user interface 103d of multi-threaded application 103. User interface 103d includes one or more user interface elements 103d1-103dn.

At least some of user interface elements 103d1-103dn are bound to data from one or more data sources. The one or more data sources can be located on computer system 101 or on any of the one or more other computer systems such as computer system 102a. For example, data source 105a is located on computer system 101 while data source 105b is located on computer system 102a. In some embodiments, data source 105a can be located within a cloud of computer systems.

Data binding allows a user interface element to be automatically updated when the data to which the user interface element is bound is updated. A user interface element to which data is bound may or may not display the data within the user interface. For example, the data may comprise text that is displayed within a user interface element such as a listbox, or the data may comprise configuration parameters that define the appearance of the user interface element.

User interface thread 103a is configured to perform asynchronous binding of data from a data source to a data target such as a user interface element to enable the user interface thread to continue execution even when updated data is not immediately available upon request. For example, user interface thread 103a's primary role within application 103 (at least in some embodiments) is to update the display of user interface 103d.

When user interface thread 103a requests updated data from a data source to which one or more of user interface elements 103d1-103dn is bound, user interface thread 103a requests that a separate thread, such as thread 103b, retrieve the updated data from the data source. While thread 103b is retrieving the updated data, user interface thread 103a continues execution without blocking until the updated data is available. As used herein, blocking refers to pausing execution until the updated data is returned such as is done when data is bound synchronously.

In some embodiments, user interface thread 103a makes a request for updated data each time a timer, such as timer 107, expires. Additionally, in some embodiments, user interface thread 103a can also make a request for updated data in response to input to the user interface such as when a user (or another application) provides input to the user interface.

After user interface thread 103a requests that thread 103b obtain updated data and while user interface thread 103a continues execution, thread 103b obtains updated data (if any) from the data source. If the data in the data source has been updated, thread 103b retrieves the data and stores it in local cache 106. Additionally, thread 103b notifies user interface thread 103a, for example, via notification 108, that updated data has been stored in local cache 106. In some embodiments, notification 108 is an event that is fired on user interface thread 103a. Additionally, notification 108 can be added to a queue of notifications.

Notification 108 does not cause user interface thread 103a to immediately retrieve the updated data from local cache 106. In contrast, user interface thread 103a continues execution until timer 107 expires at which point user interface thread 103a can process notification 108. Processing notification 108 can include accessing local cache 106 to retrieve the updated data and populating the updated data into the corresponding user interface elements.

In this way, user interface thread 103a does not attempt to populate updated data into the user interface until the updated data is immediately available in local cache 106. Instead of blocking on a request for updated data, embodiments described herein reduce or eliminate the number of freezes that the user may experience when interacting with user interface 103d because user interface thread 103a does not block when it requests updated data. The majority of the processing involved in propagating updated data from a data source to a data target is performed by a separate thread other than the user interface thread thus improving the perceived performance of user interface 103d.

In some embodiments of the present invention, timer 107 is configurable to allow the specification of the frequency at which user interface thread 103a requests and/or retrieves updated data. For example, a developer of application 103 can set a timer frequency. In other embodiments, a user of application 103 can dynamically set the timer frequency.

As stated above, when timer 107 expires, user interface thread 103a can perform various actions. For example, user interface thread 103a can process any notifications, such as notification 108, it has received. User interface thread 103a can also initiate a request for updated data via a separate thread such as thread 103b. In this manner, any changes to data in the underlying data source will be detected and propagated to the data target automatically at a periodic interval.

User interface thread 103a can also initiate a request for updated data at any time such as in response to input to the user interface. For example, a user may provide input to the user interface that requests updated data for an element of the user interface. In response to the input, user interface thread 103a can access local cache 106 to determine whether updated data is present and if so, populate the updated data into the user interface element. However, if updated data is not present (for example, if the local cache stores a null value for the data), the user interface element can request that a separate thread obtain updated data from the data source to which the user interface element is bound.

In some embodiments, user interface thread 103a employs a queue of notifications. Each time a notification is generated (e.g. by one or more separate threads performing retrieval of data from data sources), the notification can be added to the queue. For example, notification 108 can be added to the queue. The queue may be part of user interface thread 103a, or may be a separate component within application 103.

Then, at some time, such as when timer 107 expires, user interface thread 103a can access the queue to process each notification including retrieving any updated data in local cache 106 that the notification represents.

In some embodiments, a specified number of notifications in the queue can be processed by user interface thread 103a each time timer 107 expires. The number of notifications can be a user-configurable number. For example, a developer (or user) can specify that five notifications are to be processed each time timer 107 expires. Accordingly, at most five data updates will be processed each time timer 107 expires even if the queue contains more than five notifications of updated data.

Embodiments described herein also include applying effects when updated data is populated into the user interface. For example, when it obtains updated data from local cache 106, user interface thread 103a can cause the updated data to appear in the corresponding user interface element in different ways. The effect that is applied to updated data as it is populated into the user interface element can be a developer (or user) customizable option.

For example, applications conforming to the binding model described herein can provide various different effects that the user can specify (e.g. by selecting a property of a component of the application) to cause the specified effect to be applied when data is populated into an associated user interface element. In some embodiments, each user interface element can include a property that allows the user to specify the effect for each user interface element independently. Example effects that can be applied include fading in, sliding in, growing and shrinking, etc.

Embodiments described herein can also provide the developer (or user) of application 103 with an option to specify whether data binding to the elements of the user interface is to occur synchronously or asynchronously. When the developer specifies that data binding should occur synchronously, user interface thread 103a blocks on a request for updated data. In contrast, when the developer specifies that data binding should occur asynchronously, user interface thread 103a requests updated data asynchronously, as described above, by employing a separate thread to obtain the updated data. In other embodiments, whether data binding occurs synchronously or asynchronously can be specified by a user of application 103.

Figure 2:
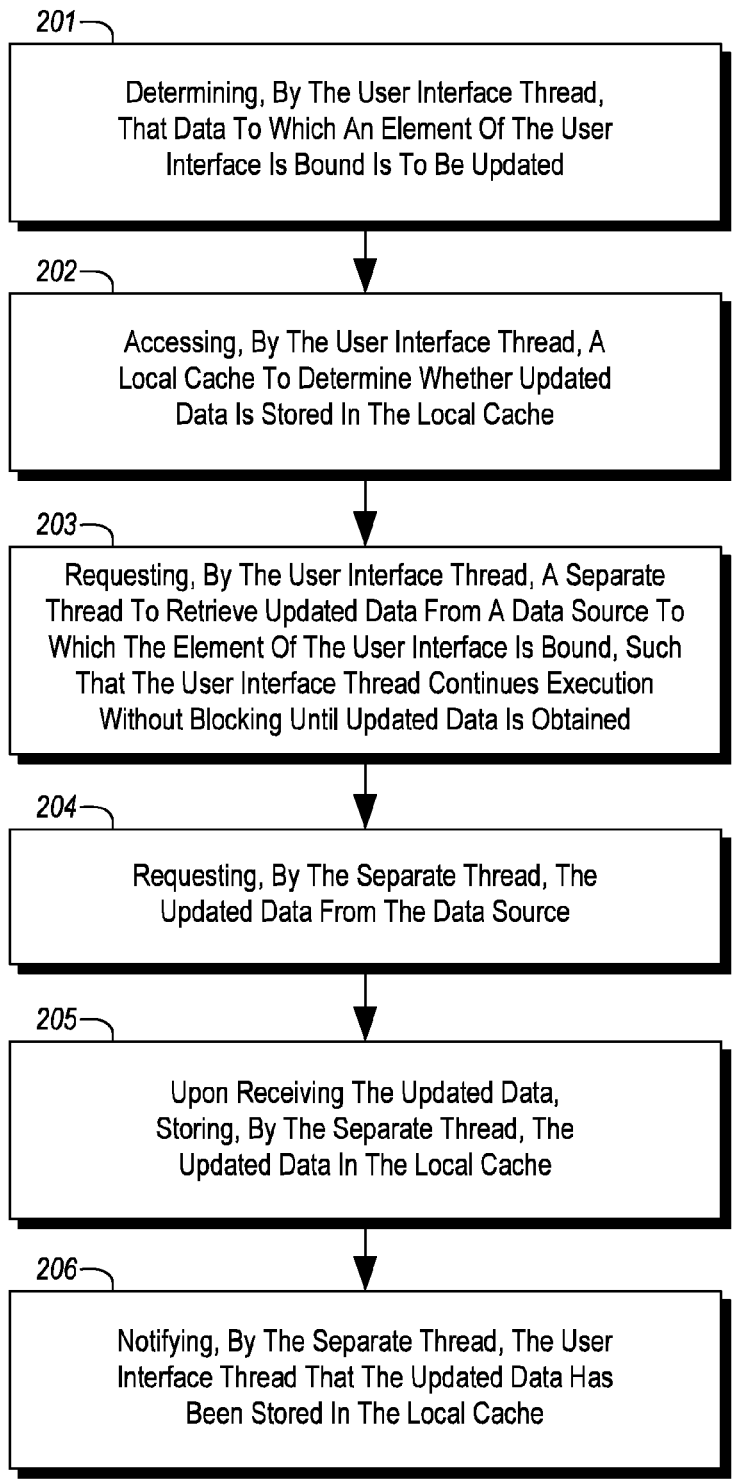
FIG. 2 illustrates a flow chart of an example method for asynchronously binding data from a binding source to a binding target.

FIG. 2 illustrates a flow chart of an example method 200 for asynchronously binding data from a binding source to a binding target. Method 200 will be described with respect to the components and data of computer architecture 100.

Method 200 includes an act 201 of determining, by the user interface thread, that data to which an element of the user interface is bound is to be updated. For example, user interface thread 103a may determine that data to which user interface element 103d1 is bound is to be updated. The determination that data to which the user interface element is bound is to be updated can be based on the expiration of a timer, such as timer 107, a specific request for updated data either from a user or another process executing on the computer system, or any other means.

Method 200 includes an act 202 of accessing, by the user interface thread, a local cache to determine whether updated data is stored in the local cache. For example, user interface thread 103a can access local cache 106 to determine whether local cache 106 stores updates to the data bound to user interface element 103d1. If local cache 106 stores updated data, user interface thread 103a can apply the updated data to the data bound to the corresponding user interface element. For example, if the user interface element is a textbox, and the data bound to the textbox is text to be displayed within the textbox, user interface thread 103a may populate the text into the textbox.

Method 200 includes an act 203 of requesting, by the user interface thread, a separate thread to retrieve updated data from a data source to which the element of the user interface is bound, such that the user interface thread continues execution without blocking until updated data is obtained. For example, user interface thread 103a can request that thread 103b retrieve updated data from the data source that the user interface element is bound to. While thread 103b obtains the updated data from the data source, user interface thread 103a continues execution without blocking until the updated data is obtained and returned.

User interface thread 103a can make the request for updated data in response to determining that updated data is not stored in the local cache, or can make the request after obtaining updated data in local cache (e.g. to cause newer updated data to be stored in the local cache at the next time when user interface thread 103a checks for updated data in the local cache).

Method 200 includes an act 204 of requesting, by the separate thread, the updated data from the data source. For example, thread 103b can request data from, or otherwise access data stored within, a local data source such as data source 105a or a remote data source such as data source 105b. Data sources 105a and 105b can represent any of a number of different types of data sources. In one specific example, a binding source component is added to a data source to enable the data within the data source to be bound to.

Method 200 includes an act 205 of upon receiving the updated data, storing, by the separate thread, the updated data in the local cache. For example, thread 103b can store updated data in local cache 106.

Method 200 includes an act 206 of notifying, by the separate thread, the user interface thread that the updated data has been stored in the local cache. For example, thread 103b can send notification 108 to notify user interface thread 103a that the updated data is stored in local cache 106. Notification 108 can comprise an event, such as a property changed event, that is fired on user interface thread 103a. Thread 103b can also notify user interface thread 103a by adding notification 108 to a queue.

The queue can store all notifications of updated data that user interface thread 103a received during a period of time, such as between timer expirations or between requests for updated data, from any number of separate threads used to retrieve data from data sources. When user interface thread 103a checks for pending notifications, each notification in the queue can be processed to populate all updated data from local cache 106 into the corresponding elements of user interface 103d.

The above description describes one way data flow from a data source to a data target (e.g. elements of a user interface). However, the asynchronous binding techniques used to propagate changes in data from the source to the target can also be used to propagate changes in data from the target to the source. For example, if data within a user interface element (the data target) is updated, the updated data can be propagated back to the data source (e.g. a property of an object, an item in a list, an element in a database, etc.).

When propagating updated data from the data target to the data source, the process described above may be performed in generally a reverse order. For example, when data of a user interface element is updated (e.g. in response to user input), user interface thread 103a can store the updated data in local cache 106 and raise an event or queue a notification of the updated data on thread 103b (or another thread handling data propagation). User interface thread 103a can then continue execution while thread 103b propagates the updated data back to the data source.

While user interface thread 103a continues execution, thread 103b obtains the updated data from cache 106 and propagates the updated data to the corresponding data source. In some embodiments, once the data source has been updated with the updated data, user interface thread 103a is notified of the update.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   at least one processor; and
   one or more storage medium having stored computer-executable instructions which, when executed by the at least one processor, implement a method of asynchronously binding data from a binding source to a binding target, wherein the computing system executes a multi-threaded application which displays a user interface via a user interface thread, and wherein the method includes:
   determining, by the user interface thread, that data to which an element of the user interface is bound is to be updated;
   accessing, by the user interface thread, a local cache to determine whether updated data is stored in the local cache;
   requesting a separate thread to retrieve updated data from a data source to which the element of the user interface is bound, such that the user interface thread continues execution without blocking until updated data is obtained;
   wherein the updated data is requested from the data source by the separate thread; and
   upon receiving the updated data, storing the updated data in the local cache.

2. The computing system of claim 1, wherein the method further includes detecting that updated data has been stored in the local cache.

3. The computing system of claim 1, wherein the computing system comprises a mobile device.

4. The computing system of claim 1, wherein the method further includes accessing, by the user interface thread, the local cache to retrieve the updated data.

5. The computing system of claim 4, wherein the method further includes accessing the local cache to retrieve the updated data in response to a timer expiring.

6. The computing system of claim 5, wherein the timer represents a duration of time since the user interface thread previously accessed the local cache to retrieve the updated data.

7. The computing system of claim 5, wherein a duration of the timer is user configurable.

8. The computing system of claim 4, wherein the method further includes populating the updated data into the element of the user interface.

9. The computing system of claim 8, further comprising:
applying one or more user specified effects to the updated data as the updated data is populated into the element of the user interface.

10. The computing system of claim 4, wherein the method further includes receiving user input at the user interface that requests that the data be updated.

11. The computing system of claim 1, wherein said requesting the separate thread to retrieve updated data is performed by the user interface thread and is performed in response to the user interface thread determining that the local cache does not store updated data for the user interface element.

12. The computing system of claim 1, wherein the method includes the separate thread storing the updated data in the local cache and notifying the user interface thread that updated data has been stored in the local cache.

13. The computing system of claim 12, wherein notifying, by the separate thread, the user interface thread that the updated data has been stored in the local cache comprises the separate thread firing an event on the user interface thread.

14. The computing system of claim 12, wherein notifying, by the separate thread, the user interface thread that the updated data has been stored in the local cache comprises the separate thread adding an event to a queue on the user interface thread, the queue including one or more other events indicating that data to which one or more other elements of the user interface are bound has been updated and stored in the local cache.

15. The computing system of claim 14, wherein the method further comprises:
after a timer expires on the user interface thread, processing, by the user interface thread, each event in the queue.

16. The computing system of claim 15, wherein processing, by the user interface thread, each event in the queue comprises:
accessing, by the user interface thread, the local cache to retrieve the updated data to which each of the one or more other elements of the user interface is bound; and
populating the updated data into each of the one or more elements of the user interface.

17. A computer-readable storage device for use at a computer system which executes a multi-threaded application that displays a user interface via a user interface thread, the computer-readable storage device storing computer executable instructions which when executed by a processor perform a method of asynchronously binding data from a binding source to a binding target, the method comprising:
determining, by the user interface thread, that data to which an element of the user interface is bound is to be updated;
accessing, by the user interface thread, a local cache to determine whether updated data is stored in the local cache;
requesting a separate thread to retrieve updated data from a data source to which the element of the user interface is bound, such that the user interface thread continues execution without blocking until updated data is obtained;
wherein the updated data is requested from the data source by the separate thread; and
upon receiving the updated data, storing the updated data in the local cache.

18. The computer-readable storage device of claim 17, wherein the method further includes detecting that updated data has been stored in the local cache and populating the updated data into the corresponding one or more elements of the user interface, wherein the updated data is stored in the local cache by the separate thread.

19. The computer-readable storage device of claim 17, wherein said requesting the separate thread to retrieve updated data is performed by the user interface thread and is performed in response to the user interface thread determining that the local cache is not storing updated data for the user interface element.

20. A method, which is implemented at a computer system that includes at least one processor executing a multi-threaded application that displays a user interface via a user interface thread, of asynchronously binding data from a binding source to a binding target, the method comprising:
determining, by the user interface thread, that data to which an element of the user interface is bound is to be updated;
accessing, by the user interface thread, a local cache to determine whether updated data is stored in the local cache;
requesting a separate thread to retrieve updated data from a data source to which the element of the user interface is bound, such that the user interface thread continues execution without blocking until updated data is obtained;
wherein the updated data is requested from the data source by the separate thread; and
upon receiving the updated data, storing the updated data in the local cache.

* * * * *